United States Patent
Frailong et al.

(10) Patent No.: US 8,924,687 B1
(45) Date of Patent: *Dec. 30, 2014

(54) SCALABLE HASH TABLES

(71) Applicant: Juniper Networks, Inc., Sunnyvale, CA (US)

(72) Inventors: Jean-Marc Frailong, Los Altos, CA (US); Anurag P Gupta, Saratoga, CA (US); David Talaski, Los Altos, CA (US); Sanjeev Singh, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/936,903

(22) Filed: Jul. 8, 2013

Related U.S. Application Data (63) Continuation of application No. 12/606,322, filed on Oct. 27, 2009, now Pat. No. 8,484,439.

(51) Int. Cl.
  *G06F 12/00* (2006.01)
  *G06F 9/26* (2006.01)
  *G06F 9/34* (2006.01)
  *G06F 12/06* (2006.01)

(52) U.S. Cl.
  CPC ........................... *G06F 12/06* (2013.01)
  USPC .............................................. 711/216

(58) Field of Classification Search
  None
  See application file for complete search history.

(56) References Cited

U.S. PATENT DOCUMENTS

| 6,145,064 | A | 11/2000 | Long et al. |
|---|---|---|---|
| 6,434,662 | B1 | 8/2002 | Greene et al. |
| 7,248,585 | B2 | 7/2007 | Kohn et al. |
| 8,484,439 | B1 | 7/2013 | Frailong et al. |
| 2003/0210689 | A1* | 11/2003 | Davis et al. ............... 370/389 |
| 2010/0023726 | A1 | 1/2010 | Aviles |

* cited by examiner

*Primary Examiner* — April Y Blair
*Assistant Examiner* — Gary W Cygiel
(74) *Attorney, Agent, or Firm* — Harrity & Harrity, LLP (57) ABSTRACT

A data read/write system receives a key associated with a data read request. The data read/write system hashes the key to obtain a first hash value and hashes the key to obtain a second hash value, where the second hash value is different than the first hash value. The data read/write system obtains a pointer from a pointer array using the first and second hash values, and uses one or more bits of the pointer and the first hash value to retrieve data from a data look-up array.

20 Claims, 12 Drawing Sheets

SCALABLE HASH TABLES

RELATED APPLICATION

This application is a continuation of U.S. patent application Ser. No. 12/606,322, filed Oct. 27, 2009, now U.S. Pat. No. 8,484,439, the entire disclosure of which is incorporated herein by reference.

BACKGROUND

A hash table is a data structure that uses a hash function to map identifiers (called "keys") to associated data. The hash function transforms the key into an index to an array element, called a bucket. The index is used to retrieve data from the bucket corresponding to the index. Hash tables are generally more efficient than search trees or other table look-up structures. Hash tables, therefore, are widely used in many kinds of computer software, particularly for associative arrays and database indexing. Hash tables that store key information in each table entry are, however, limited in scalability when the size of the key and the number of keys grows large.

SUMMARY

In accordance with one embodiment, a method, implemented by a data read/write system, may include receiving a first key in association with a request to read data from the data read/write system. The method may further include generating a first hash from the first key using a first hash generator and generating a second hash from the first key using a second hash generator, where the second hash is different than the first hash. The method may also include indexing a bucket array with the first hash to locate a bucket in the bucket array and comparing the second hash with entries in the bucket to identify a matching entry. The method may additionally include retrieving a pointer, from a pointer array, that corresponds to the identified matching entry in the bucket and combining the second hash with selected bits of the pointer to obtain a particular index. The method may further include using the particular index to index a data look-up array to retrieve a second key from the data look-up array.

In a further implementation, a data read/write system may include at least one memory to store a bucket array, a pointer array, and a data look-up array, and a key handling unit to receive a first key in association with a request to read data from the data read/write system. The data read/write system may further include a first hash generator to generate a first hash from the first key using a first hash generator, and a second hash generator to generate a second hash from the first key using a second hash generator, where the second hash is different than the first hash. The key handling unit may index the bucket array with the first hash to locate a bucket in the bucket array, compare the second hash with entries in the bucket to identify a matching entry, retrieve a pointer, from the pointer array, that corresponds to the identified matching entry in the bucket, combine the second hash with one or more bits of the pointer to obtain an index, and use the index to index the data look-up array to retrieve a second key from the data look-up array.

In another implementation, a method, implemented by a data read/write system, may include receiving a key associated with a data read request, hashing the key to obtain a first hash value, and hashing the key to obtain a second hash value, where the second hash value is different than the first hash value. The method may further include obtaining a pointer from a pointer array using the first and second hash values, and using one or more bits of the pointer and the first hash value to retrieve data from a data look-up array.

In still another implementation, a data read/write system may include a memory to store a pointer array, a data look-up array, and a bucket array, and a key handling unit to receive a first key associated with a data read request. The system may further include a first hash generator to hash the first key to obtain a first hash value and a second hash generator to hash the first key to obtain a second hash value, where the second hash value is different than the first hash value. The key handling unit may obtain a pointer from the pointer array using the first and second hash values, combine one or more bits of the pointer and the first hash value to obtain an index value, and index the data look-up array with the index value to retrieve data from the data look-up array.

In yet another implementation, a data read/write system may include means for receiving a first key in association with a request to read data from the data read/write system, means for generating a first hash from the first key using a first hash generator, and means for generating a second hash from the first key using a second hash generator, where the second hash is different than the first hash. The system may further include means for indexing a bucket array with the first hash to locate a bucket in the bucket array, and means for comparing the second hash with entries in the bucket to identify a matching one of the entries. The system may also include means for retrieving a pointer, in a pointer array, that corresponds to the matching one of the entries in the bucket, means for combining the second hash with one or more bits of the pointer to obtain an index, and means for using the index to index a data look-up array to retrieve data from the data look-up array.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers may be used in different drawings to identify the same or similar elements.

Also, the following detailed description does not limit the invention. Instead, the scope of the invention is defined by the appended claims and equivalents.

Previous solutions to the problem of limited scalability in hash tables, when the size of the key and the number of keys grow large, have involved using pointers as "surrogate keys" in each hash table entry. These solutions, however, fail to scale to large table sizes because the pointers become large. When the pointers become large, the number of entries per fixed-size hash table bucket becomes smaller. This means that the amount of memory bandwidth required to search the hash table becomes larger, which limits scalability. Additionally, if the hardware is meant to support multiple hash tables, each with a different number of hash keys, the large pointer imposes a penalty on all hash tables regardless of the number of keys defined for each table.

Exemplary embodiments, described herein, rely on two fields to describe the key within a hash bucket and the location of the key in memory. The first field is a surrogate hash which is a hash of the key associated with the hash table entry. Surrogate hashes, for each key, may be stored in a hash bucket array. A second field is a pointer field which is a fragment of a pointer to the data to be retrieved in a data look-up array. The pointer field may be stored in an array separate from the bucket array and the data look-up array. The surrogate hash may be combined with the pointer field to generate an index for indexing the data look-up array to retrieve data. Use of a surrogate hash in combination with a separately stored pointer field may reduce the demand on memory bandwidth and permit multiple hash tables to be handled, using a different number of keys, while using a same hardware data structure.

Exemplary Environment

Figure 1:
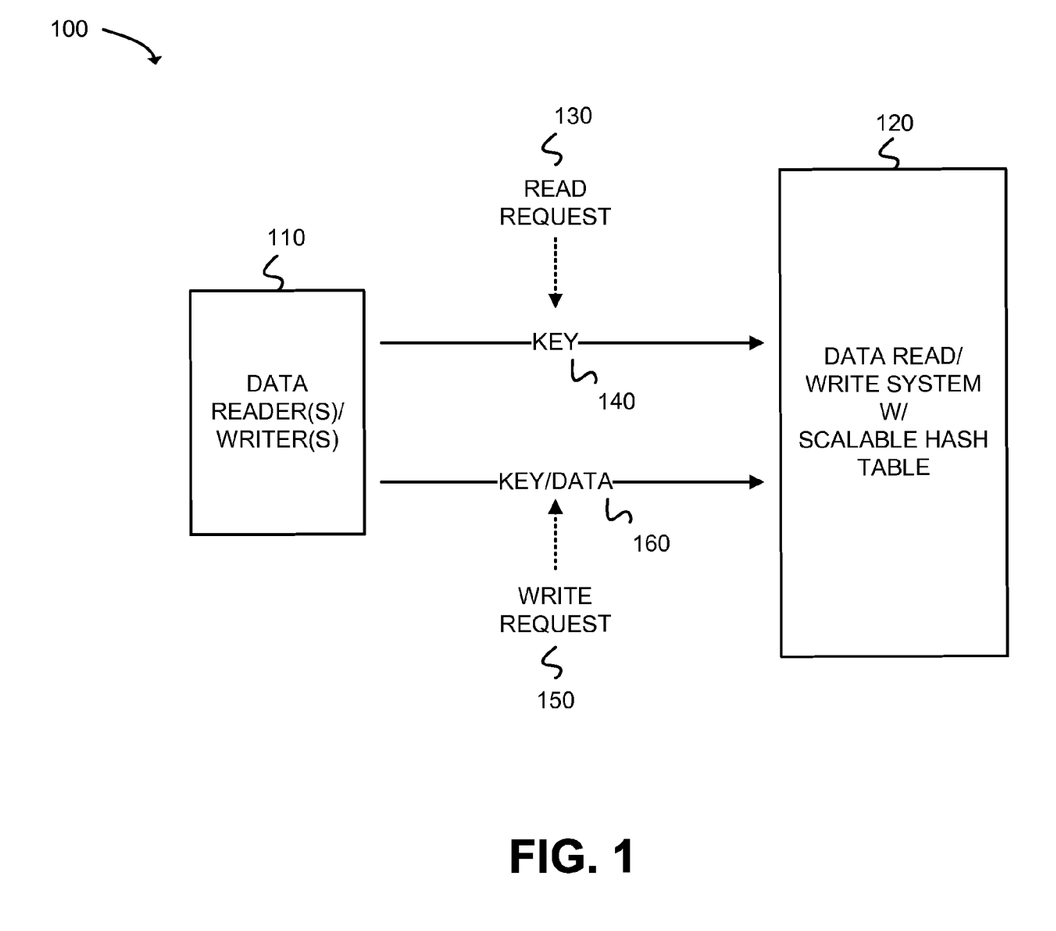
FIG. 1 is a diagram of an exemplary environment in which data may be written to, and read from, a data read/write system that includes a scalable hash table.

FIG. 1 is a diagram of an exemplary environment 100 in which one or more data readers or data writers 110 may read data from, and/or write data to, a data read/write system 120. Data read/write system 120 may include a scalable hash table, as described in further detail herein. As shown in FIG. 1, data reader reader(s)/writer(s) 110 may send a read request 130 to data read/write system 120 to read a specific item of data from system 120. Read request 130 may include a key 140 for retrieving the requested item of data from data read/write system 120. Upon receipt of key 140 in read request 130, data read/write system 120 may use the key to retrieve data from the scalable hash table (described further below).

Reader(s)/writer(s) 110 may also, or alternatively, send a write request 150 to data read/write system 120 to write data to system 120. Write request 150 may include a key and/or data 160 that is to be written into memory in data read/write system 120. Upon receipt of key and/or data 160, data read/write system 120 may use the key to write the data into the memory.

The number of data reader(s)/writers 110 shown in, and described with respect to, FIG. 1 is exemplary. Fewer, or additional, data reader(s)/writer(s) than those shown may be included in environment 100.

Exemplary Devices

Figure 2:
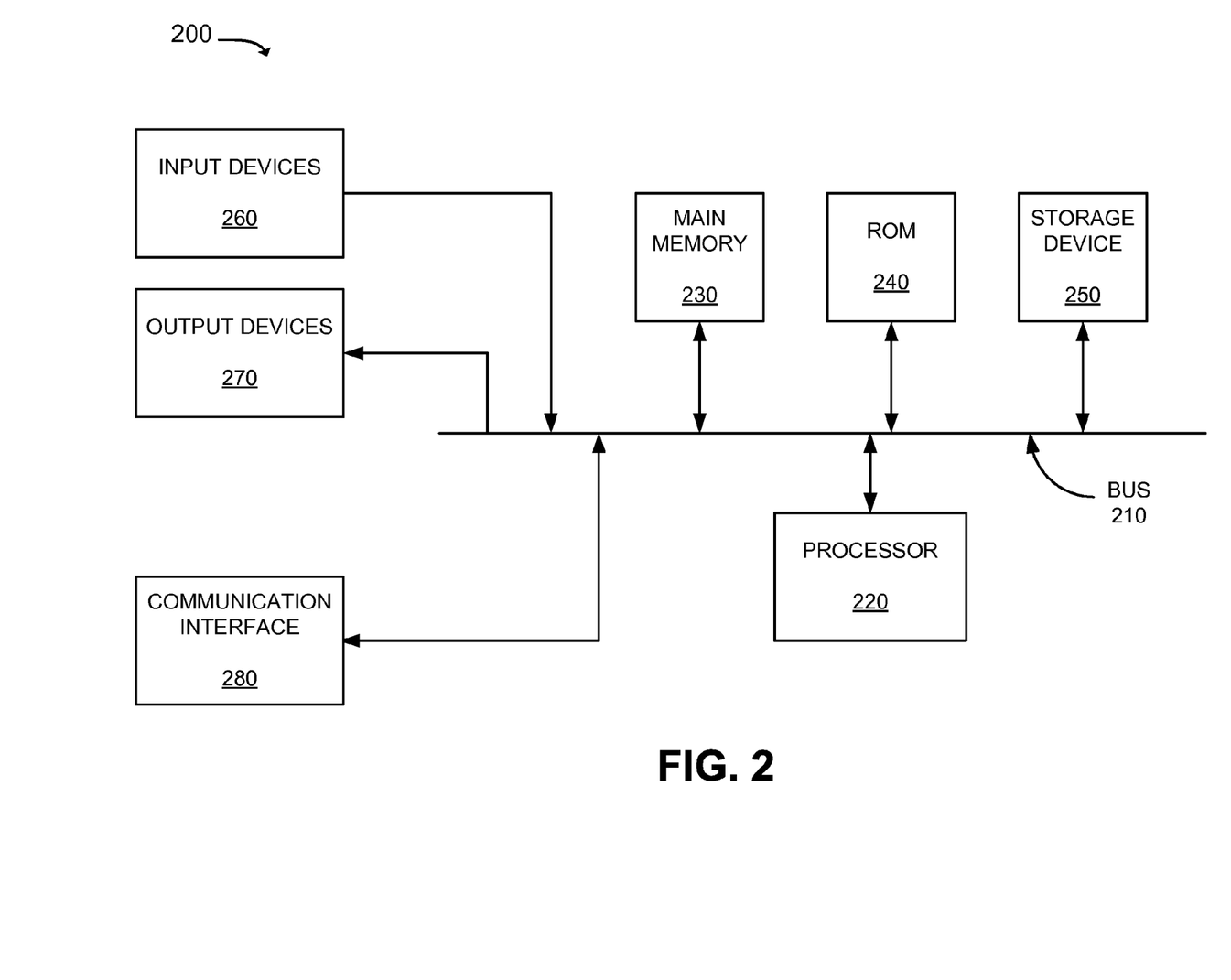
FIG. 2 is a diagram of components of a device, of one exemplary embodiment, in which the environment of FIG. 1 may be implemented.

FIG. 2 is a diagram of components of a device 200, of one exemplary embodiment, in which the exemplary environment 100 of FIG. 1 may be implemented. In the exemplary embodiment of FIG. 2, environment 100 may be implemented within a computational device that uses a hash table to read data from, and/or write data to, memory. Device 200 may include, for example, a desktop, palmtop or laptop computer. Device 200 may include a bus 210, a processor 220, a main memory 230, a read only memory (ROM) 240, a storage device 250, input device(s) 260, output device(s) 270, and a communication interface 280. Bus 210 may include a path that permits communication among the components of device 200.

Processor 220 may include, for example, a processor, microprocessor, and/or processing logic that may interpret and execute instructions. In some implementations, processor 220 may include multiple processors (e.g., parallel processors). Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive or some form of flash memory.

Input device(s) 260 may include one or more mechanisms that permit an operator to input information to device 200, such as a keyboard, a mouse, a pen, voice recognition and/or biometric mechanisms, etc. Output device(s) 270 may include one or more mechanisms that output information to the operator, including a display, a printer, a speaker, etc. Communication interface 280 may include any transceiver-like mechanism that enables device 200 to communicate with other devices and/or systems.

Device 200 may perform certain operations or processes, as will be described in detail below. Device 200 may perform these operations in response to processor 220 executing software instructions contained in a computer-readable medium, such as memory 230. A computer-readable medium may be defined as a physical or logical memory device. A logical memory device may include memory space within a single physical memory device or spread across multiple physical memory devices.

The software instructions may be read into memory 230 from another computer-readable medium, such as storage device 250, or from another device via communication interface 280. The software instructions contained in memory 230 may cause processor 220 to perform operations or processes that will be described later. Alternatively, hardwired circuitry may be used in place of or in combination with software instructions to implement processes described herein. Thus, exemplary implementations are not limited to any specific combination of hardware circuitry and software.

Figure 3:
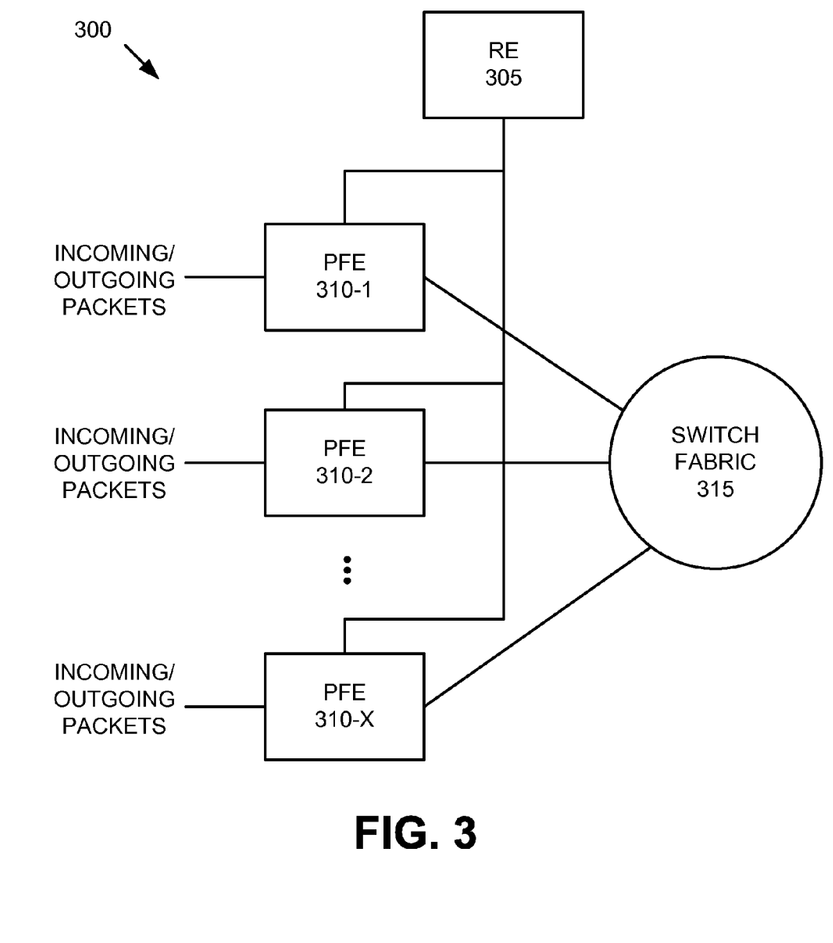
FIG. 3 is a diagram of components of another exemplary embodiment, in which the environment of FIG. 1 may be implemented.

FIG. 3 is a diagram depicting another exemplary embodiment, in which the environment 100 of FIG. 1 may be implemented. As shown in FIG. 3, a network device 300 may take the form of a switch or router for forwarding packets, or other types of data units. In the exemplary embodiment of FIG. 3, environment 100 may be implemented within one or more packet forwarding engines (PFEs), or routing engines (REs), within device 300, where a scalable hash table may contribute to the packet forwarding process (or the forwarding of other types of data units). Device 300 may receive one or more data streams from a physical link, process the data stream(s) to determine destination information, and transmit the data stream(s) on one or more links in accordance with the destination information.

Device 300 may include a routing engine (RE) 305 and multiple packet forwarding engines (PFEs) 310-1 through 310-X (where X>1) interconnected via a switch fabric 315. Switch fabric 315 may include one or more switching planes to facilitate communication between two or more of PFEs

310. In one exemplary embodiment, each of the switching planes may include a three-stage switch of crossbar elements.

RE 305 may include processing logic that performs high-level management functions for device 300. For example, RE 305 may communicate with other networks and systems connected to device 300 to exchange information regarding network topology. RE 305 may create routing tables based on the network topology information and forwarding tables based on the routing tables. RE 305 may install the forwarding tables in PFEs 310. PFEs 310 may use the forwarding tables to perform route lookup for incoming packets. RE 305 may also perform other general control and monitoring functions for device 300.

Each of PFEs 310 may connect to RE 305 and switch fabric 315. PFEs 310 may receive data on physical links connected to a network, such as a wide area network (WAN), local area network (LAN), or a wireless network. Each physical link could be one of many types of transport media, such as optical fiber or Ethernet cable. The data on the physical link may be formatted according to one of several protocols, such as the synchronous optical network (SONET) standard, asynchronous transfer mode (ATM) technology, or Ethernet.

In the exemplary embodiment of FIG. 3, the packets may be written to memory, and/or read from memory, using a scalable hash table, as described herein.

Exemplary Data Read/Write System with Scalable Hash Table

Figure 4:
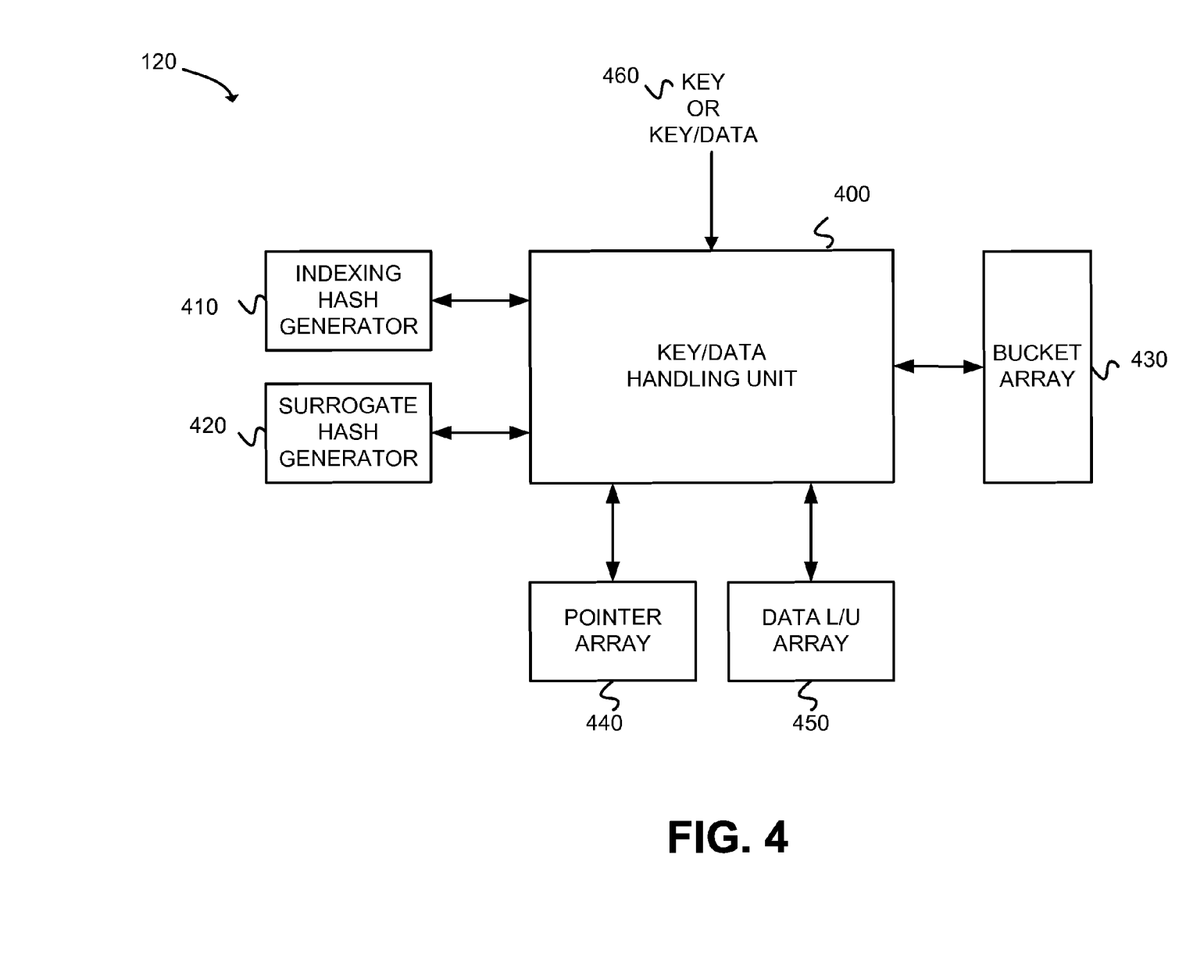
FIG. 4 is a diagram of exemplary functional components of the data read/write system of FIG. 1.

FIG. 4 is a diagram of exemplary functional components of data read/write system 120 of FIG. 1. Data read/write system 120 may include a key/data handling unit 400, an indexing hash generator 410, a surrogate hash generator 420, a bucket array 430, a pointer array 440 and a data look-up (L/U) array 450. The "scalable hash table," as referred to herein, may include bucket array 430 and pointer array 440.

Key/data handling unit 400 may be implemented by software, hardware, or by a combination of software and hardware. Key/data handling unit 400 may receive input keys associated with read requests, or input keys and data, associated with write requests. Unit 400 may supply the keys to indexing hash generator 410 and surrogate hash generator 420. Unit 400 may then receive the generated hash index from indexing hash generator 410, and the generated surrogate hash from surrogate hash generator 420. Unit 400 may use the hash index to index bucket array 430 to locate a specific bucket. Unit 400 may additionally compare the surrogate hash obtained from hash generator 420 with one or more entries within the located bucket in bucket array 430. If a matching entry in the bucket is found (i.e., the surrogate hash matches the hash value stored in an entry in the bucket), then unit 400 may locate a corresponding entry in pointer array 440 to retrieve a pointer. Unit 400 may combine a portion of the bits in the pointer retrieved from pointer array 440 with the bits of the surrogate hash to obtain an index. Unit 400 may use the obtained index to retrieve a key, and associated data, from data L/U array 450.

Indexing hash generator 410 and surrogate hash generator 420 may each perform a hash function on the received key to convert a large, possibly variable-sized, amount of data in the key into a small, fixed amount of data. Each hash function may include, for example, the MD5 message digest algorithm, the secure hash algorithm (SHS), or RIPEMD-160. Any other type of hash function may also be used by indexing hash generator 410 and/or surrogate hash generator 420. Using respective hash functions, indexing hash generator 410 and surrogate hash generator 420 may convert the key, including N bits, to data including M bits, where M bits is less than N bits. Indexing hash generator 410 may implement a different hash function than surrogate hash generator 420, or may implement a same hash function that uses different hashing parameters. For example, in one exemplary embodiment, indexing hash generator 410 may implement a hash function that operates upon the variable number of bits of the key to generate a 32 bit hash index for each key, and surrogate hash generator 420 may implement a different hash function that operates upon the variable number of bits of the key to generate a 14 bit surrogate hash value for each key.

Bucket array 430 may include an array of buckets, with each bucket of the array having its own index value. Each bucket in array 430 may further include multiple entries, with each entry storing a hash value associated with a key, and associated data, that is stored in data L/U array 450.

Pointer array 440 may store multiple entries, with each entry including a pointer having multiple bits. Each entry in pointer array 440 may map to an entry in a bucket of array 430. A one-to-one mapping, therefore, may exist between each bucket entry in each bucket in array 430 and a corresponding entry in pointer array 440.

Data L/U array 450 may store a key and associated data. The stored key may correspond to the key originally received by unit 400 in the read or write request. The key stored in array 450 may be compared with the originally received key to identify a match between the two. A match between the two may indicate that the data associated with the key in array 450 is the proper data to be retrieved and returned in response to the read request.

The components depicted in FIG. 4 are exemplary. System 120 may include additional, fewer, different, and/or differently arranged components than those shown in FIG. 4. Additionally, any one of the components shown in FIG. 4 may perform tasks described herein as being performed by another one of the components.

Exemplary Data Read Process

Figure 5A:
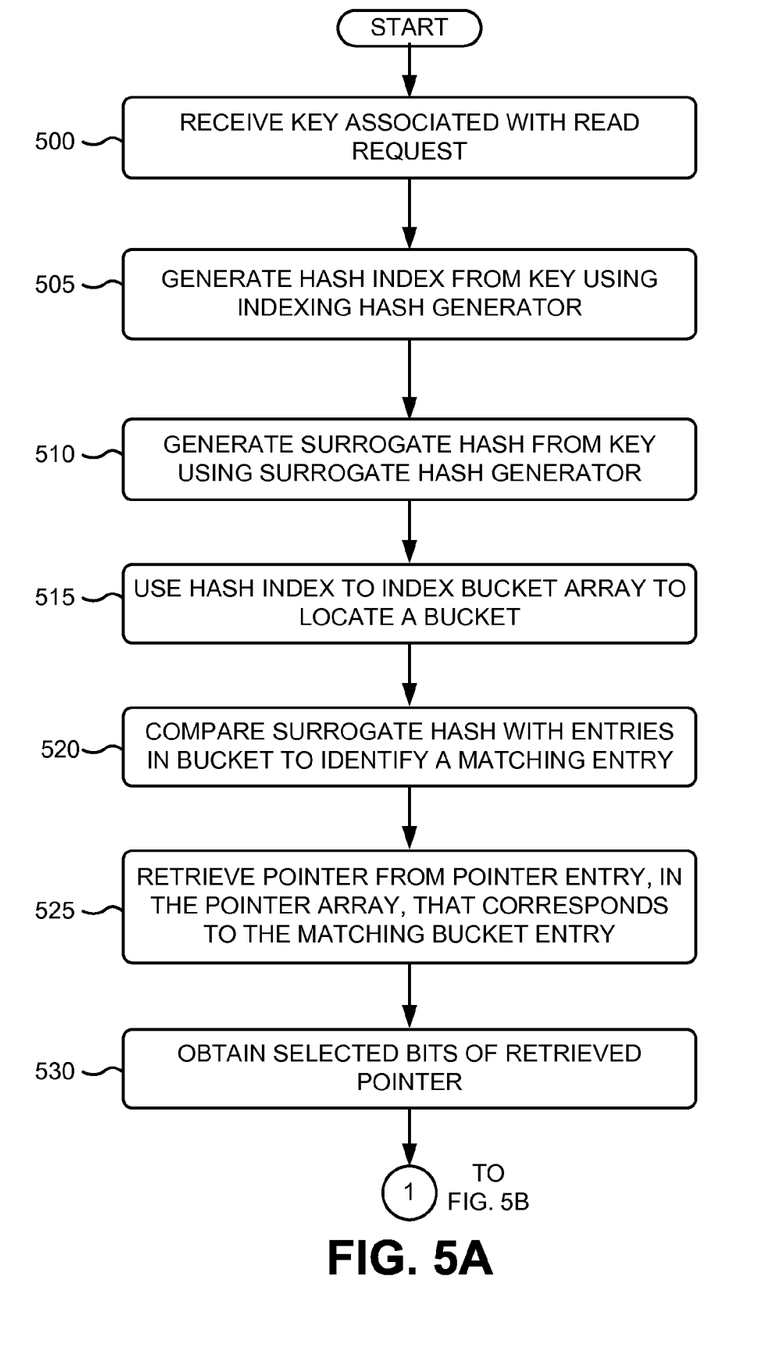
FIGS. 5A and 5B are flow charts that illustrate an exemplary process for reading data from the scalable hash table of the data read/write system of FIG. 1.
Figure 5B:
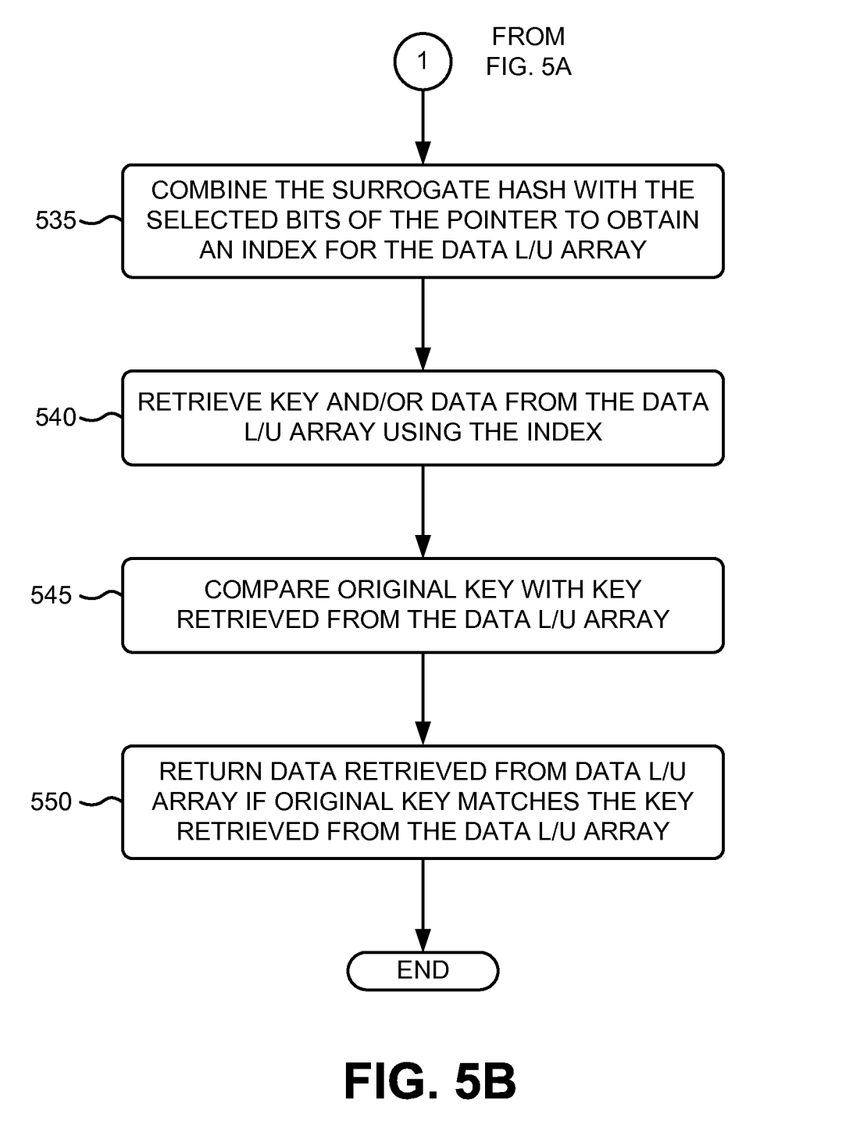

FIGS. 5A and 5B are flow charts that illustrate an exemplary process for reading data from system 120. The exemplary process of FIGS. 5A and 5B may be implemented by key/data handling unit 400 of system 120. In other embodiments, some or all of the blocks described below may be performed by another entity, device, or a combination of entities or devices. The exemplary process is described below with reference to FIGS. 6A and 6B, which depict an example of the process for reading data from the scalable hash table of system 120.

The exemplary process may include receiving a key associated with a read request (block 500). Key/data handling unit 400 may receive a key associated with the read request from data reader(s)/writer(s) 110. Upon receipt, unit 400 may supply the key to indexing hash generator 410 and to surrogate hash generator 420.

Figure 6A:
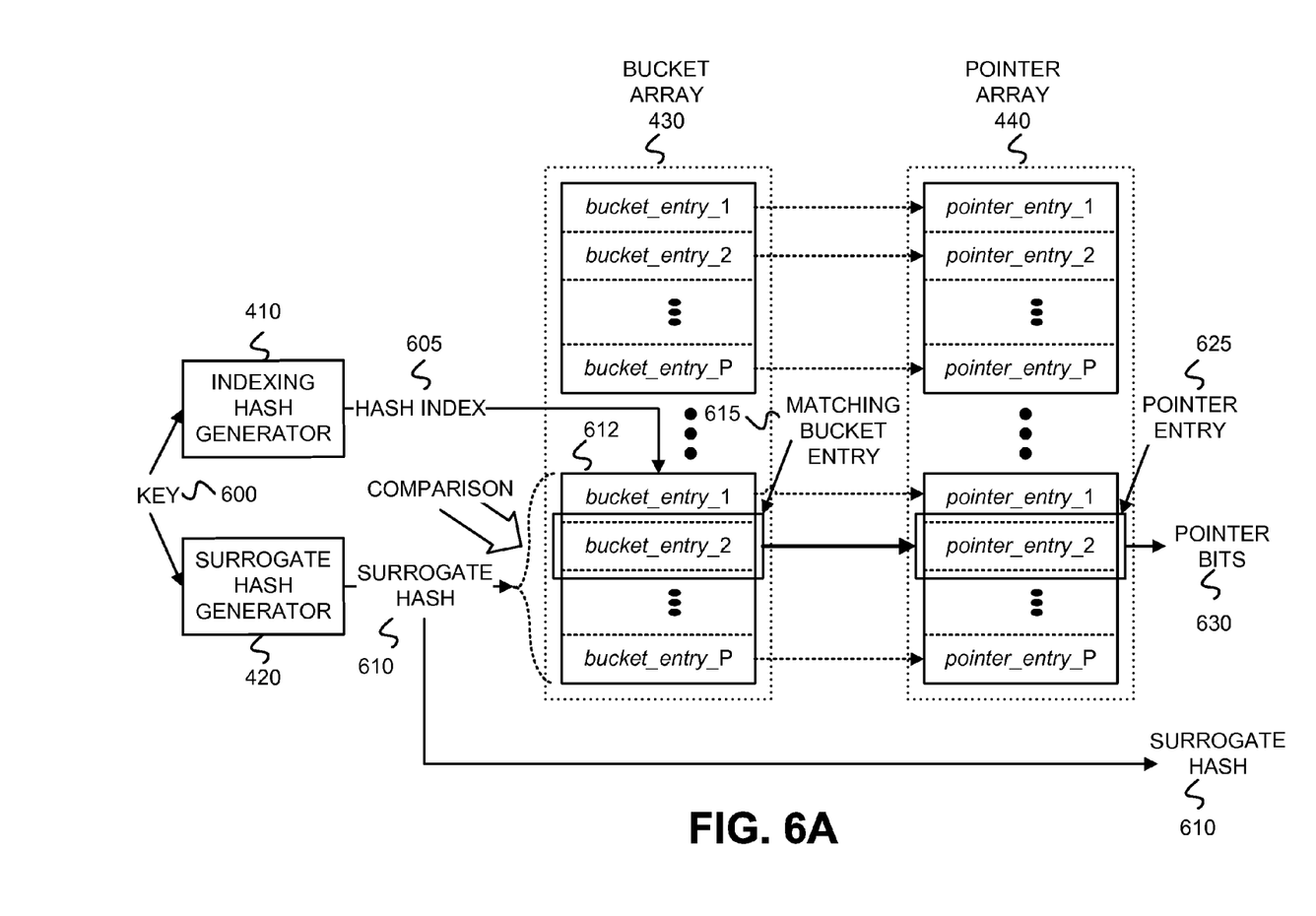
FIGS. 6A and 6B depict an example of the process of FIGS. 5A and 5B for reading data from the scalable hash table of the data read/write system of FIG. 1.

A hash index may be generated from the key using the indexing hash generator (block 505) and a surrogate hash may further be generated from the key using the surrogate hash generator (block 510). Referring to FIG. 6A, indexing hash generator 410 uses the input key 600 to generate hash index 605, and surrogate hash generator 420 uses the input key 600 to generate a surrogate hash 610.

The hash index may be used to index the bucket array to locate a bucket (block 515). FIG. 6A depicts hash index 605 being used to index into bucket array 430 to point to a specific bucket 612. The surrogate hash may be compared with entries in the bucket to identify a matching entry (block 520). As shown in FIG. 6A, surrogate hash 610 may be compared with each bucket entry in bucket 612 to identify a bucket entry 615 that matches surrogate hash 610.

A pointer from a pointer entry, in the pointer array, that corresponds to the matching bucket entry may be retrieved (block 525). As shown in FIG. 6A, each pointer entry in pointer array 440 maps to a corresponding bucket entry in bucket array 430. Therefore, pointer entry 625, which maps to matching bucket entry 615, may be retrieved from pointer array 440.

Figure 6B:
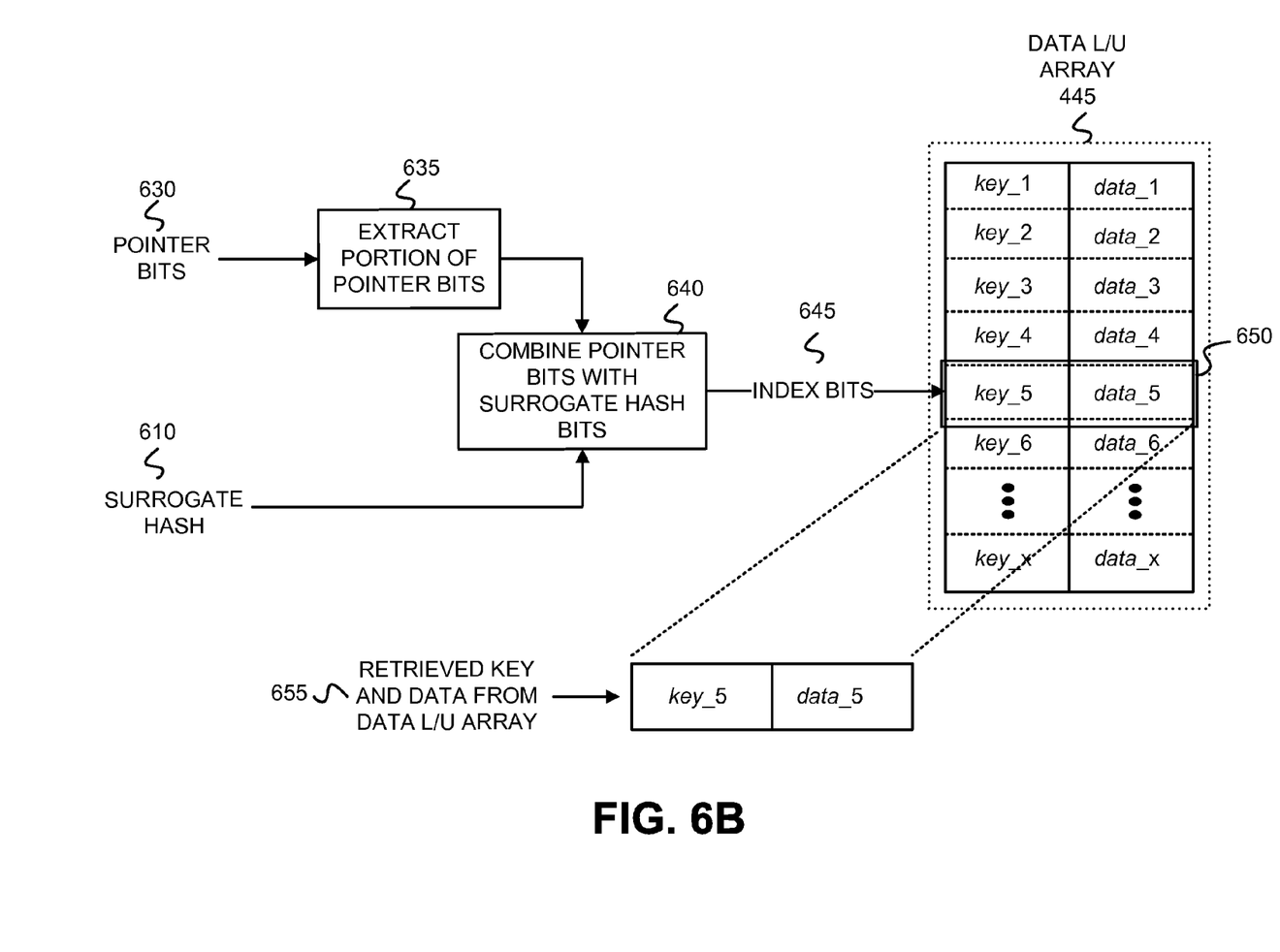

Selected bits of the retrieved pointer may be obtained (block 530). Selected pointer bits 630 of the pointer retrieved from array 440 may be obtained. The number of bits obtained from the retrieved pointer may be based on a size of the data L/U array 450. In implementations where the size of data L/U array 450 is large, a greater number of bits may be obtained from pointer bits 630. FIG. 6B depicts extraction 635 of a portion of bits from pointer bits 630.

The surrogate hash may be combined with the selected bits of the pointer to obtain an index for the data L/U array (block 535). In one embodiment, the selected bits may be concatenated with the surrogate hash. FIG. 6B depicts the extracted portion of bits of pointer bits 630 being combined 640 with the bits of surrogate hash 610 to produce index bits 645.

A key and/or data may be retrieved from the data L/U array 450 using the index (block 540). As shown in FIG. 6B, index bits 645 may be used to locate key and data 650 in data L/U array 450 so that the key and data can be retrieved 655.

The originally received key may be compared with the key retrieved from the data L/U array 450 (block 545). A comparison of the originally received key with the key retrieved from data L/U array 450 may indicate whether a correct key and data 650 has been retrieved from data L/U array 450.

The data retrieved from the data L/U array 450 may be returned if the original key matches the key retrieved from the data L/U array 450 (block 550). A match between the original key and the key retrieved from data L/U array 450 may indicate that the correct data has been retrieved from data L/U array 450. Returning of the retrieved data to, for example, the requesting data reader 110, may complete the data read process.

Exemplary Data Write Process

Figure 7A:
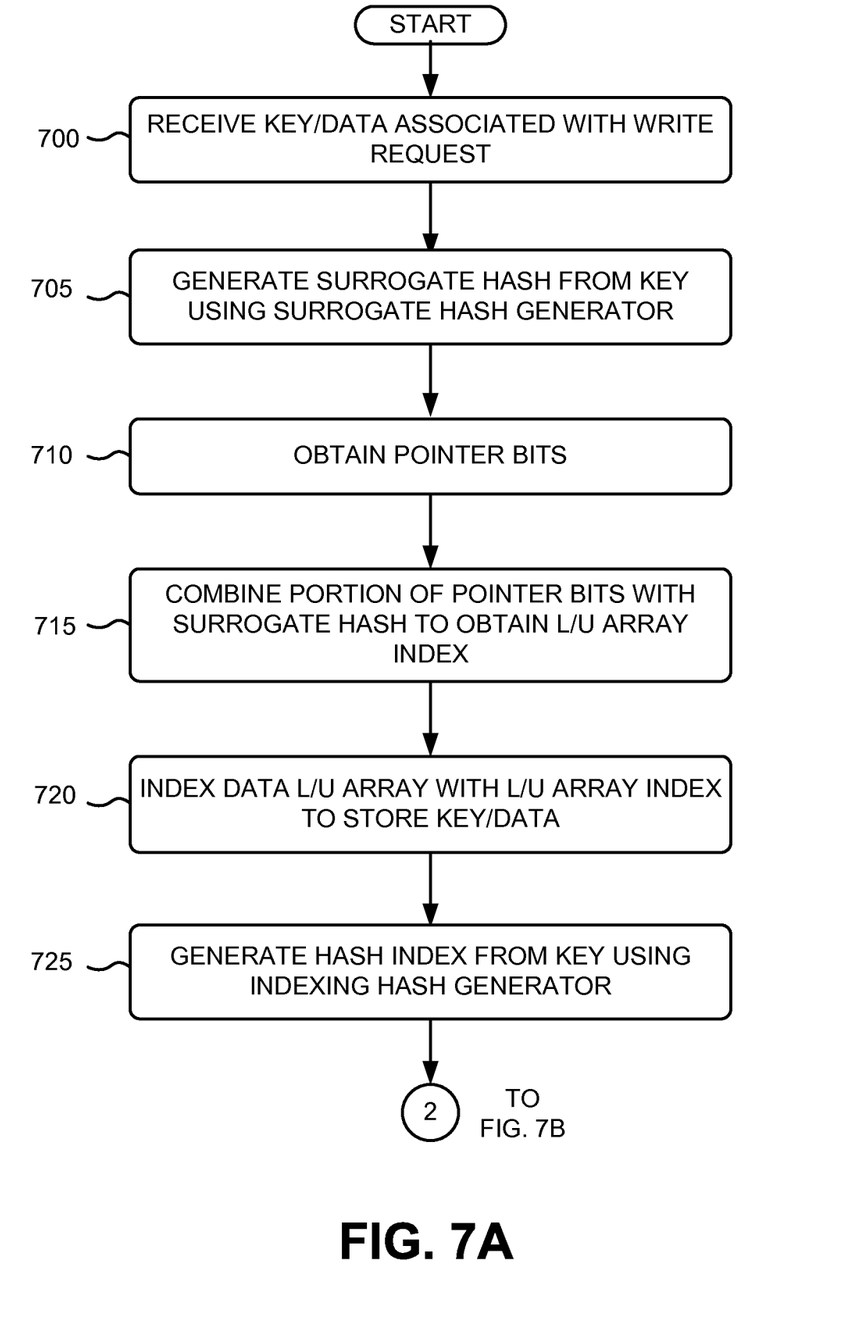
FIGS. 7A and 7B are flow charts that illustrate an exemplary process for writing data to the scalable hash table of the data read/write system of FIG. 1.
Figure 7B:
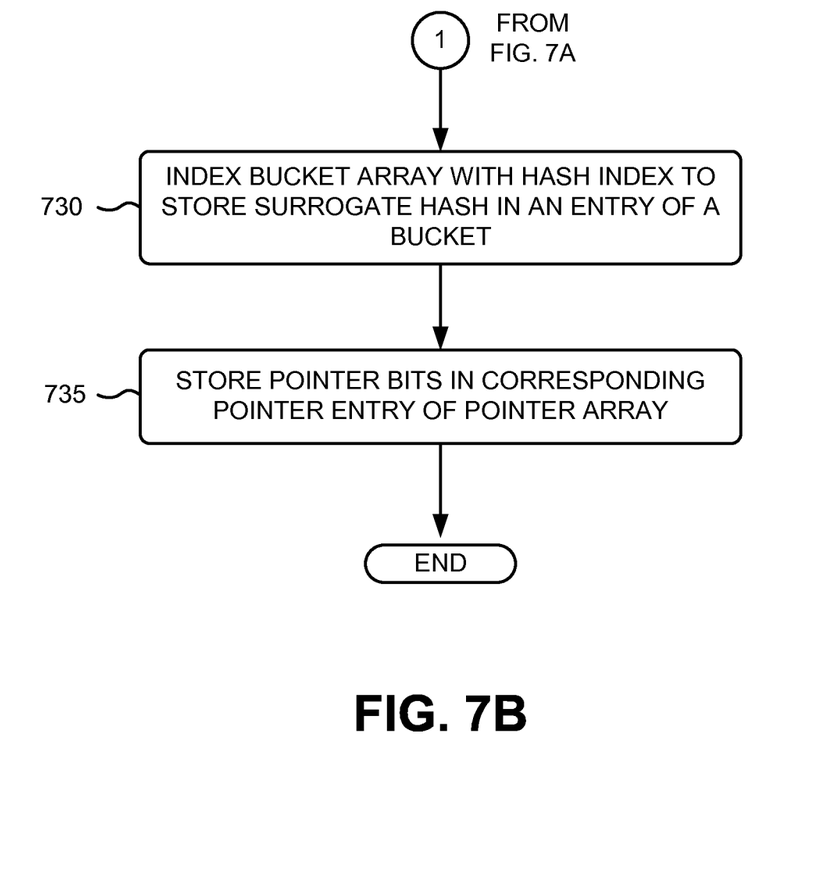

FIGS. 7A and 7B are flow charts that illustrate an exemplary process for writing data to the scalable hash table of system 120. The exemplary process of FIGS. 7A and 7B may be implemented by key/data handling unit 400 of data read/write system 120. In other embodiments, some or all of the blocks described below may be performed by another entity, device, or a combination of entities or devices. The exemplary process is described below with reference to FIGS. 8A and 8B, which depict an example of the process for writing data to system 120.

Figure 8A:
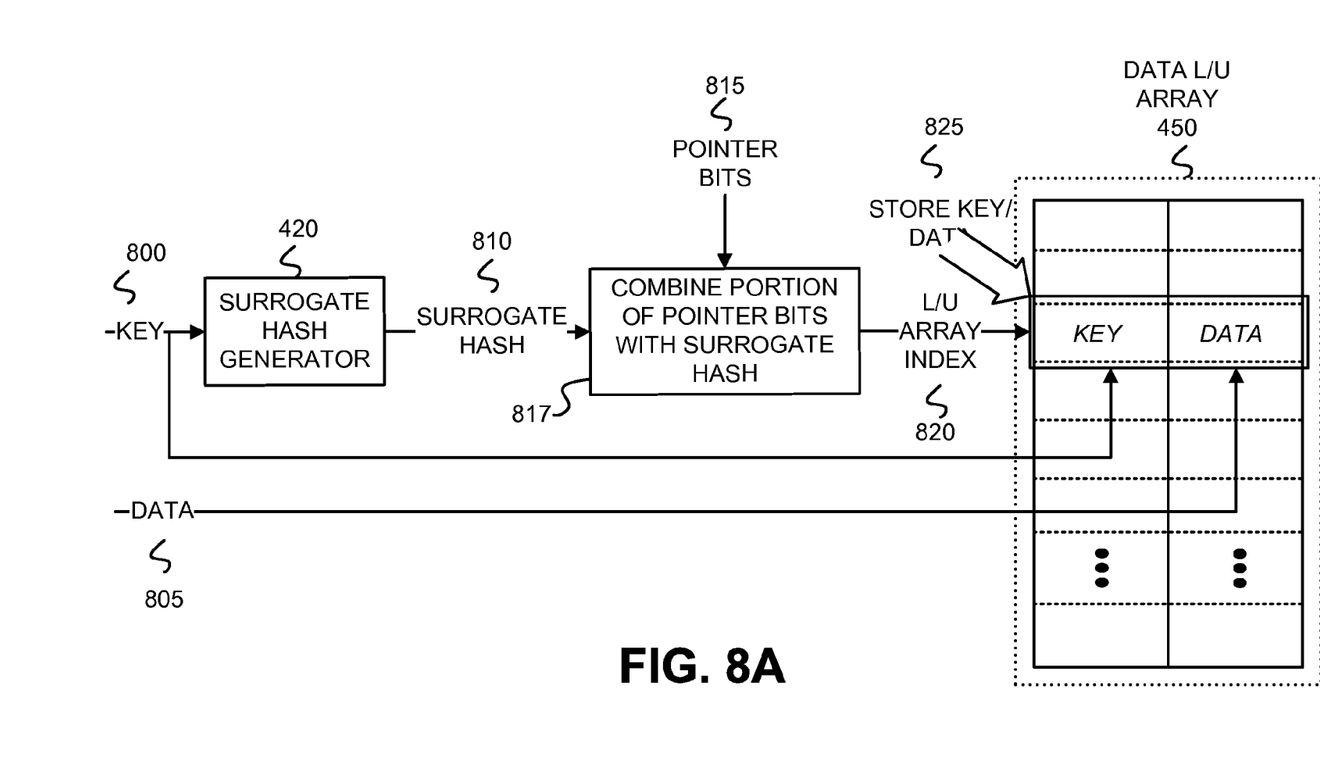
FIGS. 8A and 8B depict an example of the process of FIGS. 7A and 7B for writing data to the scalable hash table of the data read/write system of FIG. 1.

The exemplary process may include receiving a key and corresponding data associated with a write request (block 700). FIG. 8A depicts receipt of key 800 and data 805, where data 805 is the data to be stored in data L/U array 450 and key 800 may be converted to an index that can be used to retrieve data 805 from data L/U array 450 subsequent to storage. A surrogate hash may be generated from the key using the surrogate hash generator (block 705). As shown in FIG. 8A, surrogate hash generator 240 may generate surrogate hash 810 from key 800.

Pointer bits may be obtained (block 710). FIG. 8A depicts obtaining pointer bits 815 for use in storing key 800 and data 805 in data L/U array 450. Pointer bits 815 may be obtained based on determining what bits need to be combined with the bits of the surrogate hash to store key 800 and data 805 in a certain entry in data L/U array 450. Using a simple example, if the surrogate hash is 0011100 and the entry in data L/U array 450 to store the key and data is indexed at 1100011100, then the pointer bits would be determined to include the bits 110 (and possibly other additional bits).

A portion of the pointer bits may be combined with the surrogate hash to obtain a L/U array index (block 715). FIG. 8A depicts pointer bits 815 being combined 817 with the bits of surrogate hash 810 to produce a L/U array index 820. The data L/U array 450 may be indexed with the L/U array index to store the key and data (block 720). As shown in FIG. 8A, data L/U array 450 may be indexed with L/U array index 820 to store 825 key 800 and data 805.

Figure 8B:
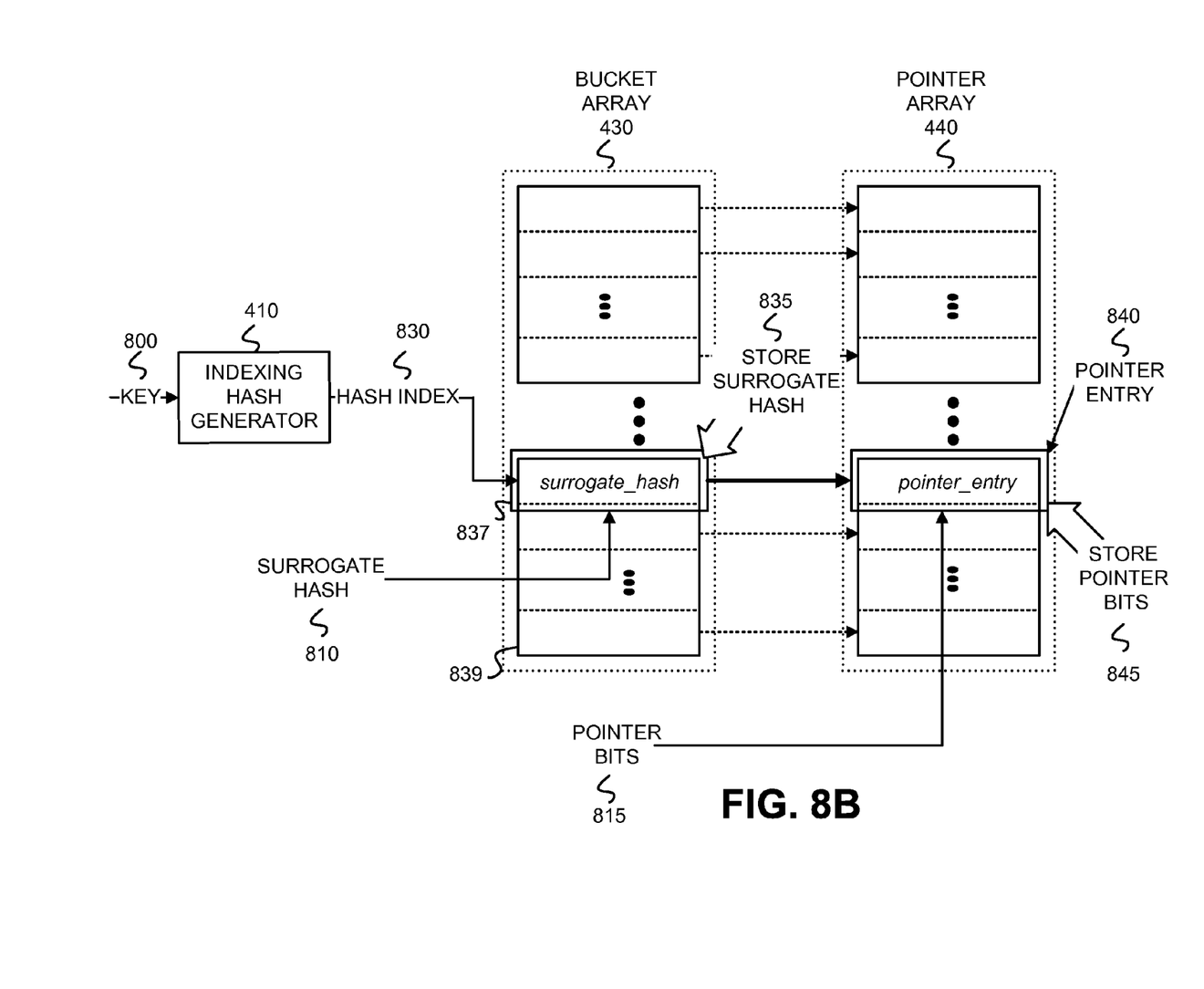

The hash index may be generated from the key using the indexing hash generator (block 725). FIG. 8B depicts indexing hash generator 410 hashing key 800 to generate a hash index 830. The bucket array may be indexed with the hash index to store the surrogate hash in an entry of a bucket (block 730). As shown in FIG. 8B, bucket array 430 may be indexed with hash index 830 to store 835 surrogate hash 810 in an entry 837 of a bucket 839 in bucket array 430.

The pointer bits may be stored in a corresponding pointer entry of the pointer array (block 735). FIG. 8B depicts pointer bits 815 being stored 845 in pointer entry 840 that maps to bucket entry 837 of bucket 839. The exemplary write process, initiated in response to a write request, may then complete.

Conclusion

As described herein, a scalable hash table may be implemented that reduces the required memory bandwidth and which permits multiple hash tables to be handled, using a different number of keys, while using a same hardware data structure. The scalable hash table may use two different and separate fields to describe the key within a hash bucket and the location of the data and key in memory, and may combine the two fields to generate an index for retrieving the data and the key.

The foregoing description of embodiments described herein provides illustration and description, but is not intended to be exhaustive or to limit the embodiments described herein to the precise form disclosed. Modifications and variations are possible in light of the above teachings or may be acquired from practice of the invention.

While series of blocks have been described with respect to FIGS. 5A, 5B, 7A and 7B, the order of the blocks may vary in other implementations. Also, non-dependent blocks may be performed in parallel.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed:

1. A method comprising:
    receiving, by a device, data and a key,
        the key and the data being associated with a request to store the key and the data in a particular location of a first data structure;
    generating, by the device, a hash value using the key,
        the hash value including a plurality of bits;
    obtaining, by the device and from a second data structure, pointer bits,
        the pointer bits being obtained based on:
            bits associated with the particular location, and
            the plurality of bits of the hash value;
    combining, by the device, the hash value with one or more bits of the pointer bits to obtain an index value;
    storing, by the device, the key and the data in the particular location,
        the key and the data being stored, in the particular location, using the index value;
    generating, by the device, another index value based on the key; and
    storing, by the device, the hash value in a third data structure using the other index value.

2. The method of claim 1, where obtaining the pointer bits includes:
    determining bits to be combined with the plurality of bits of the hash value to obtain the bits associated with the particular location.

3. The method of claim 1, further comprising:
    storing the pointer bits in a fourth data structure.

4. The method of claim 3, further comprising:
    retrieving the hash value from the third data structure based on a request to read the data;
    retrieving the pointer bits from the fourth data structure based on the request to read the data; and
    retrieving the data based on the retrieved pointer bits and the retrieved hash value.

5. The method of claim 4, where retrieving the hash value includes:
    retrieving the hash value using the other index value.

6. The method of claim 4, where the hash value is stored in an entry of the third data structure, and
    where the pointer bits are stored in an entry of the fourth data structure,
        the entry of the fourth data structure mapping to the entry of the third data structure, and
    where retrieving the pointer bits includes:
        retrieving the pointer bits based on the entry of the fourth data structure mapping to the entry of the third data structure.

7. The method of claim 4, where retrieving the data based on the retrieved pointer bits and the retrieved hash value includes:
    combining the retrieved the pointer bits with the retrieved hash value to retrieve the data.

8. A system comprising:
    a device to:
        receive data and a key,
            the data and the key being associated with a request to store the data and the key in a location of a first data structure,
                the location being associated with an index value;
        generate a hash value using the key,
            the hash value including a plurality of bits;
        obtain, from a second data structure, pointer bits,
            the pointer bits being obtained based on:
                bits associated with the index value, and
                the plurality of bits of the hash value;
        combine the hash value with one or more bits of the pointer bits to obtain the index value;
        store the data and the key in the location,
            the data and the key being stored, in the location, using the index value;
        identify an entry in a third data structure for storing the hash value; and
        store the hash value in the entry in the third data structure.

9. The system of claim 8, where, when obtaining the pointer bits, the device is further to:
    determine bits, of the pointer bits, to combine with the plurality of bits of the hash value to store the key and the data in the location.

10. The system of claim 8, where the device is further to:
    generate another index value based on the key; and
    where, when identifying the entry in the third data structure, the device is to:
    identify, using the other index value, the entry in the third data structure for storing the hash value.

11. The system of claim 8, where the device is further to:
    store the hash value in the entry in the third data structure.

12. The system of claim 11, where the entry in the third data structure maps to an entry in a fourth data structure, and
    where the device is further to:
        store the pointer bits in the entry in the fourth data structure.

13. The system of claim 12, where the device is further to:
    retrieve the hash value from the third data structure based on a request to read the data;
    retrieve the pointer bits from the fourth data structure based on the entry in the third data structure mapping to the entry in the fourth data structure; and
    retrieve the data based on the retrieved pointer bits and the retrieved hash value.

14. The system of claim 13, where, when retrieving the hash value, the device is to:
    retrieve the hash value using the other index value.

15. The system of claim 13, where, when retrieving the data, the device is to:
    combine the retrieved pointer bits with the retrieved hash value to retrieve the data.

16. A non-transitory computer-readable medium storing instructions, the instructions comprising:
    a plurality of instructions which, when executed by a device, cause the device to:
        receive data and a key,
            the data and the key being associated with a request to store the data and
            the key in an entry in a first data structure;
        generate a hash value from the key,
            the hash value including a plurality of bits;
        obtain, from a second data structure, pointer bits,
            the pointer bits being obtained based on:
                bits associated with the entry in the first data structure, and
                the plurality of bits of the hash value;
        combine the hash value with a portion of the pointer bits to obtain an index value;
        store the data and the key in the entry in the first data structure,
            the data and the key being stored, in the entry in the first data structure, using the index value;
        identify an entry in a third data structure for storing the hash value; and
        store the hash value in the entry in the third data structure.

17. The non-transitory computer-readable medium of claim 16, where the entry in the third data structure is associated with an entry in a fourth data structure, and
where the instructions further comprise:
one or more instructions to store the pointer bits in the entry in the fourth data structure.

18. The non-transitory computer-readable medium of claim 17, where the instructions further comprise one or more instructions to:
retrieve the hash value from the entry in the third data structure based on a request to read the data;
retrieve the pointer bits from the fourth data structure based on the entry in the third data structure being associated with the entry in the fourth data structure; and
retrieve the data based on the retrieved pointer bits and the retrieved hash value.

19. The non-transitory computer-readable medium of claim 18, where the one or more instructions to retrieve the data based on the retrieved pointer bits and the retrieved hash value include:
one or more instructions to combine the retrieved pointer bits with the retrieved hash value to retrieve the data.

20. The non-transitory computer-readable medium of claim 16, where the instructions further comprise:
one or more instructions to generate another index value based on the key,
where the entry, in the third data structure, is identified using the other index value, and
where the hash value is retrieved using the other index value.

* * * * *